Oct. 21, 1941. J. K. COLLINS 2,259,682
RECEPTACLE
Filed July 6, 1940
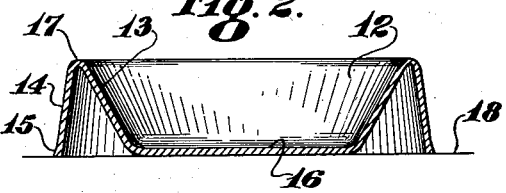
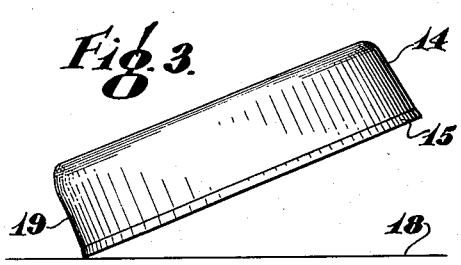
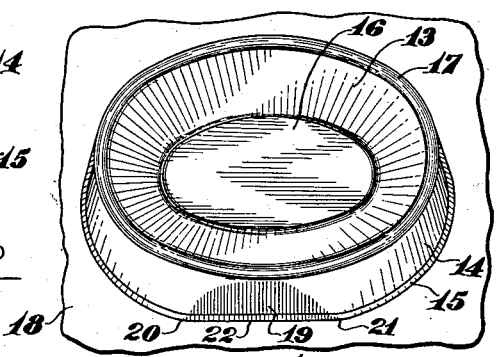
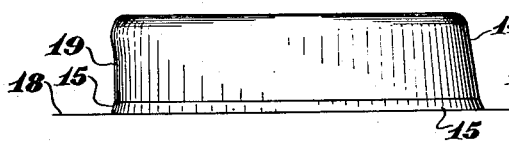
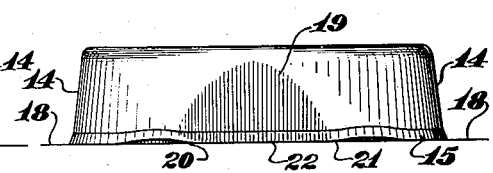
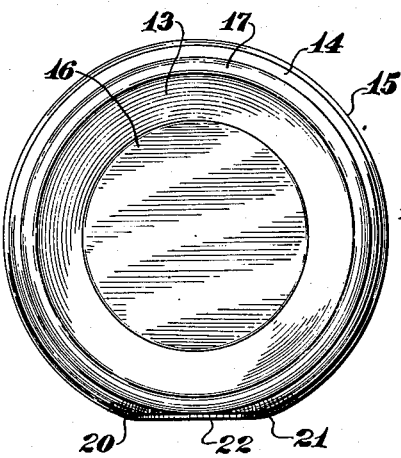
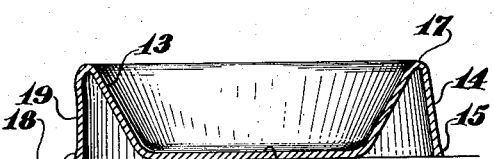
INVENTOR.
JAMES KENNEY COLLINS.
BY Patented Oct. 21, 1941

2,259,682

UNITED STATES PATENT OFFICE 2,259,682

RECEPTACLE

James Kenney Collins, Wickliffe, Ohio

Application July 6, 1940, Serial No. 344,292

7 Claims. (Cl. 119—61)

My invention relates to dishes such as feeding and watering dishes for dogs, cats, foxes and other small animals.

In the feeding of animals such as dogs and the like, several problems well known to those acquainted with the care of such animals are encountered. While the feeding of a dog is referred to herein it is to be understood that the feeding of other small animals which customarily eat from a dish, such as cats and domestically raised foxes, is included in the discussion of the problem.

Food for the dog is usually placed in the bowl of a round dish setting upon the ground, floor or other flat surface. The dog in eating the food extends its muzzle into the bowl of the dish and gathers up the food in its mouth by the action of the jaws in biting off parts of the food, by the scooping action of the teeth and lips in scraping off the food from the bowl and also by the lapping or licking action of the tongue. In this normal feeding action the dog nuzzles the dish by movement of its muzzle in the bowl and against the side of the bowl which thus tends to slide the dish along the flat supporting surface (such as the ground or floor), to tip the dish upon its edge and to roll the dish sidewards upon its annular bottom edge. These movements of the dish result in undesirable changes in the position of the dish and the spilling of the contents. Moreover, dogs and especially puppies are prone to slide and roll the dish along by movements of the paws against the dish and particularly the rim of the dish.

These problems in maintaining the stability and position of the dish as created by the eating habits of dogs present a real need for a dish readily placed upon, and removable from, a flat supporting surface and possessing structural features which resist sliding, slipping, side-rolling and tipping.

Feeding dishes heretofore in use also present other and additional problems. Metal dishes tend to rust and corrode and thus adversely affect the food contained in them. Metal dishes that have been enameled or otherwise coated tend to chip and flake with the resultant danger to the health of the dog. The swallowing of chips with the food have often caused internal hemorrhages in dogs eating out of such defective dishes.

Porcelain and china dishes have also been used but these are liable to chipping and breaking due to the above described undesirable movements to which feeding dishes are subjected and also to negligence and accidents in handling. Aside from the danger of swallowing the chips, the rough surfaces produced by the breaking and chipping easily cut the flesh of the dog eating from the damaged dish.

Many dogs and particularly young dogs are prone to bite and chew on the rim or side of the feeding dish, resulting in injury to the teeth and mouth of the dog from contact with the hard unyieldable material of the usual metal, porcelain or china dish. The use of such brittle dishes for feeding thus presents another problem heretofore unanswered.

Feeding is often done under various temperature conditions such as the feeding of sporting dogs and of domestically raised foxes out of doors in freezing weather. The freezing of the water or other contents in the usual dish utilized, and particularly china, causes a breakage of the dish by reason of its relative non-expansibility under pressure of the expanding ice. Another difficulty with the use of such dishes, and particularly metal dishes, in cold weather is the high degree of heat conductivity of the dish material. The flesh of the muzzle and tongue of the dog contacting the cold dish of high heat conductivity in freezing weather is liable to become frozen thereto and to cause the tearing of the tissue thus frozen.

An object of the present invention is the provision of a dish obviating the above described defects, disadvantages and limitations of the dishes heretofore in use.

Another object is the provision for eliminating the difficulties and dangers above described.

Another object is the provision of a dish of resilient yieldable material such as rubber and the like.

Another object is the provision of a dish of relatively non-skiddable material.

Another object is the provision of a dish of relatively non-breakable and non-chippable material.

Another object is the provision of a dish of relatively expansible material yielding to freezing and expansion of its contents.

Another object is the provision of a dish having a relatively soft resilient rim or side yieldable to the force of biting or chewing.

Another object is the provision of a dish made of a material of relatively low heat conductivity.

Another object is the provision of a round dish having a distortable edge adapted to resist sliding and side-rolling of the dish.

Another object is the provision of a dish having an annular side yieldable to pressure against the flat supporting surface to form a substantially straight line in engagement with said surface.

Another object is the provision of a dish having an outwardly flaring side yieldable to pressure against a flat supporting surface to form a brace resisting sliding, tipping and rolling of the dish.

Another object is the provision of a dish having a resiliently yieldable side flaring outwardly and downwardly to form a circular bottom edge engageable with the supporting flat surface and distortable upon being pressed against the flat surface to resist movement of the dish relative to said surface.

Another object is the provision of a dish for feeding small animals which is efficient and safe in use, economical in fabrication, and possessing unique characteristics heretofore unknown.

Other objects and a fuller understanding of my invention may be had by referring to the following description and claims, taken in conjunction with the accompanying drawing, in which:

Figure 1 is an elevational side view of a feeding dish embodying my invention;

Figure 2 is a transverse cross-sectional view taken through the dish shown in Figure 1;

Figure 3 is an elevational side view of the dish shown in Figure 1 and tipped upon its edge to illustrate the distortion of a side of the dish;

Figure 4 is a front view of the dish as tipped in Figure 3 and is at a right angle to the view of Figure 3;

Figure 5 is a view somewhat similar to that of Figure 1 and illustrates the distortion of a side of the dish upon sideward pressure of the dish against a supporting flat surface such as the floor;

Figure 6 is a front view of the dish shown in Figure 5 and is at a right angle to the view of Figure 5;

Figure 7 is a plan view looking down on the dish shown in Figure 6; and

Figure 8 is a transverse cross-sectional view taken through the dish shown in Figure 5.

The dish embodying my invention is made of material having the usual resilient yieldability of rubber, rubber and material of similar characteristics being herein referred to for purposes of definition as rubber-like material. Not only rubber of natural origin but also synthetic rubber, such as that known in the trade as "Neoprene," and plastics having the desired quality of resilient yieldability are included in the class of material used, it only being necessary that the material act in the manner herein described.

Referring to the views of the several figures, and particularly of Figures 1 and 2, the preferred form of dish embodying the features of my invention is shown generally by the reference character 11. The dish 11 has a bowl or concave portion 12 formed centrally thereof, the bowl being adapted to contain the food or water being fed to the animal. The bowl 12 has a sloping side 13 forming the confining wall extending annularly around the bowl and has the bottom 16 which may be flat, as shown, or rounded. The side 13 extends in a gradual slope upwardly and outwardly from the bottom 16 to the peripheral edge 17 of the bowl and thence bends in a reverse curve downwardly and outwardly from the edge 17 to form the flared side 14.

As shown in Figure 2 the side 13 is inclined at an angle to the vertical and likewise the side 14 is inclined at an angle to the vertical, the angle of inclination of side 14 being less than that of side 13. The side 14 terminates in a beaded bottom edge 15 which is normally circular in outline and disposed in one plane, that is a horizontal plane passing through the edge 15. The dish ordinarily rests upon a flat supporting surface such as the ground or a floor, designated in the drawing by the reference character 18.

The side 14 extends downwardly to engage the flat surface 18 and forms a wall which supports and buttresses the dish upon the flat surface. Although the bottom 16 of the bowl may support some of the weight of the dish, the height and disposition of the wall 14 is such that enough of the weight of the dish is carried by the wall 14 to assure that the bottom edge 15 around its circular outline normally engages the flat surface 18 and thus it may be said that the wall 14 supports the dish. By reason of the normal inclination of the wall 14 shown in Figure 2 it provides a buttress bracing the peripheral edge 17 of the bowl.

By reason of the yieldability and disposition of the side 14, a lateral or sideward pressure against a local area of the side flattens the side 14 in that area. For example, upon the tilting or tipping of the dish into the position illustrated in Figures 3 and 4 a portion of the circular bottom edge 15 being in relatively non-skiddable engagement with the flat surface 18 is subjected to a force which flattens it into a substantially straight line 22 extending substantially along a chord to the normal circle of the edge 15 between points 20 and 21. The line 22 along which this portion of the edge 15 is disposed is in firm non-skid engagement with the flat surface 18. The wall 14 in the vicinity of the line 22 is compressed to form a flattened wall 19 that is substantially perpendicular to the normal lateral plane of the dish. Since the flattened wall 19 is thus moved from its inclined position to said vertical position it extends downwardly somewhat below the normal plane passing through the circular bottom edge 15. The flattened wall 19 in conjunction with the adjacent arcuate wall 14 provides a brace stiffening the wall against further tipping or tilting and further resists any sliding movement of edge 15 along the flat surface 18. The edge 15 along the line 22 "digs in" or thrusts against the surface 18 and by reason of a relatively straight line engaging the surface 18 at a right angle to the line of force provides a resistance to sliding and slipping of the dish along said line of force.

Furthermore, by reason of the fact that a straight line engagement is provided between the edge 15 and surface 18, which straight line is always at a right angle to the line of force, any side-slipping or side-rolling that would otherwise result is resisted. The points 20 and 21 at the ends of the line 22 provide "corners" which resist a rolling of the dish on the bottom edge 15. A dish which retains its full circular outline is susceptible to side rolling on its edge upon a tipping or lateral movement of the dish relative to a supporting flat surface. The construction of the dish embodying my invention resists such undesirable action and insures that the straight line engagement of the bottom edge is always at a right angle to the line of force urging the dish along or against the supporting flat surface.

Another example of the treatment to which feeding dishes are subjected is illustrated in Figures 5, 6, 7 and 8 which show a modified action but which is similar in principle to that illustrated in Figures 3 and 4. Upon sideward movement of the dish in one direction, such as for example toward the left in the view of Figures 5 and 8, the bottom edge 15 in the locality toward which the dish is moved "catches on" or tightly engages the flat surface 18. The non-skid nature of the material of which the dish is made and the downward extension of the side 14 to always engage the surface 18 and the slope or flare of the side 14 insure that the side 14 in the direction or locality of the line of force moving the dish will press against the surface 18. The beading of the bottom edge 15 also assists in providing resistance to the sideward force to which the dish is subjected.

In the same manner as that described in conjunction with Figures 3 and 4, the bottom edge 15 is flattened into a substantially straight line 22 along a chord to the normal circle of the edge 15 and between the points 20 and 21 on the circumference of the circle. As more apparent in Figure 6, the disposition of the flattened wall 19 to a substantially vertical plane rather than at its normal incline thrusts the flattened wall 19 downwardly from the normal plane of the circular edge 15 and toward the flat surface 18. This somewhat raises the dish from its normal elevation and further provides that the bottom edge along the line 22 bears the force exerted upon the dish and by reason of the resultant compression of the flattened wall 19 further stiffens resistance to the sideward force exerted against the dish. The bracing of the adjacent arcuate side 14, the "crowded" or compressed condition of the flattened wall 19, the resiliently yieldable nature of the material of the dish, and the inherent resistance of the material to too high a pressure, prevent the flattened wall 19 from bending too far inward and thus assure that it remains substantially vertical while subjected to the described sideward force.

Figure 7 being a plan view of the dish shown in Figure 6 illustrates the yieldability of the bottom edge 15 to form the substantially straight line 22 between points 20 and 21 and at a right angle to the line of force. Upon the dish being subjected to pressure of a line of force in another direction the location of line 22 and flattened wall 19 accordingly and automatically changes to meet and resist the pressure in the new direction.

As described in conjunction with Figures 3 and 4, the flattening of a side to present a non-annular engagement with the flat supporting surface resists any action of side-rolling or side-slipping to which the dish would otherwise tend if it retained its annular form.

The fabrication of my dish may be made in any of the well known ways for making objects of rubber and the like. A preferred manner of making the dish is by die-cutting or otherwise forming disks or round blanks out of sheets of suitable thickness of rubber-like material having the proper characteristics. The disks or blanks are then placed in a double-cavity mold of proper design and pressure and heat are simultaneously applied to cure the rubber and mold it into the proper shape herein shown and described. The fabrication by molding uncured sheet rubber may be modified in accordance with the peculiarities of the particular material chosen. However, the fabrication is made by the methods well known to those versed in the art, it being only necessary that the article made have the general construction, and be made of the material having the proper characteristics, as herein taught.

In the actual use of the dish herein shown and disclosed it is found that a surprising consequence is obtained in that the many objections to the prior dishes are overcome and the feeding of animals with the new dish is accomplished in a more efficient, economical, safe and healthy manner.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An animal dish adapted to be supported upon a relatively flat surface and subject to such lateral and oblique movements thereof by said animal and relative to said flat surface as to cause sliding, tipping and rolling of the dish, said dish being of yieldable rubber-like sheet material having a concave central portion forming the bowl of the dish and a double-wall portion around said central portion, said double-wall portion comprising an inner-wall portion sloping upwardly and outwardly from the bottom of the said bowl to the peripheral edge of said bowl and an outer wall portion sloping downwardly and outwardly from said peripheral edge to form a supporting buttress for said bowl, said outer-wall portion having a substantially circular bottom edge engageable with said flat surface, the said rubber-like material providing resistance to sliding of said bottom edge relative to said flat surface, the yieldability of said rubber-like material and the sloping disposition of said outer-wall portion providing for the yieldable distortion of said outer-wall portion upon movement of the dish pressing a sector of the said bottom edge against said flat surface, said yieldable distortion compressing said sector of the bottom edge along a line substantially parallel to a chord to the normal circle of said bottom edge and disposed below the normal plane passing through said bottom edge to provide such engagement of said sector of the bottom edge with said flat surface as to resist sliding, tipping and rolling of the dish.

2. An animal dish of yieldable sheet material forming a bowl and an outer supporting wall extending in a slope downwardly and outwardly from the edge of said bowl, said supporting wall having a circular bottom edge engageable with the flat surface supporting said dish, the yieldability of said material and the sloping disposition of said wall providing for the compression of a section of said wall against said flat surface and the distortion of a sector of said circular bottom edge to a chord of the circle, said compressed section of the wall and distorted bottom edge resisting sliding and rolling of the dish on said flat surface.

3. An animal dish comprising rubber-like sheet material yieldable to lateral pressure formed into a bowl having sides extending upwardly and thence downwardly and outwardly in a gradual slope, the bottom edge of said sides being circular and supporting said dish and being engageable with a substantially flat surface upon which the dish sets, the yieldability of said material and the sloping disposition of said sides providing for the flattening of a part of said side upon the laterally pressing of a sector of said circular bottom edge against said flat surface and for the distortion of said sector from the normal circular line of said edge, said flattened side and distorted sector bracing the dish against sliding and rolling movement relative to said flat surface.

4. An animal dish of resiliently yieldable sheet material forming a circular bowl and an outwardly sloping skirt portion extending downwardly from the edge of the bowl to engage a supporting surface, the said skirt portion being resiliently yieldable to sideward pressure of the dish against said supporting surface, the part of the skirt portion yielding to said pressure thrusting against said supporting surface to resist movement of the dish relative to the said supporting surface.

5. An animal dish of resiliently yieldable rubber-like material forming a bowl and supporting side, the wall of said bowl and said side meeting at the peripheral edge of the bowl, said wall sloping upwardly and outwardly at a first angle to the vertical and said side sloping downwardly and outwardly at a second angle to the vertical, said second angle being less than said first angle, said side having a circular bottom edge resiliently yieldable to lateral pressure toward said wall of the bowl out of the normal circular position of the edge to resist skidding and side-rolling of the dish.

6. A receptacle formed of rubber-like material and comprising a round bowl having a reversely disposed side forming a double wall, the outer wall of the double wall flaring outwardly from the inner wall, said outer wall having a circular edge portion distortable, upon sideward movement of the receptacle against a surface, inwardly and downwardly from the normal circle of said edge portion to thrust against said surface.

7. A receptacle having a depending flange flared outwardly and downwardly from the wall of the receptacle, said flange being resiliently yieldable and being normally engageable with the surface supporting the receptacle along a circular line, said flange resiliently yielding to sideward pressure of the receptacle against said surface and forming a substantially vertical wall disposed along a chord to said circular line, the vertical wall bracing said receptacle against movement relative to said surface.

JAMES KENNEY COLLINS.